US012330725B2

(12) United States Patent
Hirata et al.

(10) Patent No.: US 12,330,725 B2
(45) Date of Patent: Jun. 17, 2025

(54) STEER-BY-WIRE STEERING APPARATUS

(71) Applicant: HITACHI ASTEMO, LTD., Hitachinaka (JP)

(72) Inventors: Atsushi Hirata, Hitachinaka (JP); Yasuhito Nakakuki, Hitachinaka (JP); Tsukasa Miyajima, Hitachinaka (JP); Huajun Liu, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 176 days.

(21) Appl. No.: 18/044,452

(22) PCT Filed: Sep. 6, 2021

(86) PCT No.: PCT/JP2021/032606
§ 371 (c)(1),
(2) Date: Mar. 8, 2023

(87) PCT Pub. No.: WO2022/059536
PCT Pub. Date: Mar. 24, 2022

(65) Prior Publication Data
US 2024/0025475 A1 Jan. 25, 2024

(30) Foreign Application Priority Data
Sep. 17, 2020 (JP) .................. 2020-156136

(51) Int. Cl.
*B62D 6/00* (2006.01)
*B62D 15/02* (2006.01)
(52) U.S. Cl.
CPC ......... *B62D 6/008* (2013.01); *B62D 15/0235* (2013.01)
(58) Field of Classification Search
CPC .... B62D 6/008; B62D 6/002; B62D 15/0235; B60D 10/04; B60D 10/18; B60D 10/20
(Continued)

(56) References Cited

U.S. PATENT DOCUMENTS

| 11,794,804 | B2* | 10/2023 | Kim | ............... B62D 15/025 |
| 2022/0363243 | A1* | 11/2022 | Yang | ............... B62D 6/002 |
| 2023/0010325 | A1* | 1/2023 | Ishio | ............... B62D 6/008 |

FOREIGN PATENT DOCUMENTS

| JP | 2004-224159 A | 8/2004 |
| JP | 2007-326460 A | 12/2007 |

(Continued)

OTHER PUBLICATIONS

International Preliminary Report on Patentability and Written Opinion dated Mar. 21, 2023 issued in International Application No. PCT/JP2021/032606, with English translation, 12 pages.

(Continued)

*Primary Examiner* — Hai H Huynh
(74) *Attorney, Agent, or Firm* — FOLEY & LARDNER LLP

(57) ABSTRACT

A steer-by-wire steering apparatus according to the present invention includes: a reaction force actuator control section that controls an output amount of a reaction force actuator; a steering actuator control section that controls a steering actuator in response to a manipulation of a steering operation input member, the steering actuator steering steered wheels via a steering unit; a deviation recognition section that recognizes a deviation between a manipulation amount of the steering operation input member and a steering amount of the steering unit; and a reaction force actuator output boost section that, when the deviation increases, increases the output amount of the reaction force actuator. Thus, the steering reaction force can be appropriately controlled in correspondence with a response delay in the steering amount of the steering unit with respect to the manipulation amount of the steering operation input member.

4 Claims, 9 Drawing Sheets

(58) Field of Classification Search
USPC .............................................. 701/41–44, 70
See application file for complete search history.

(56) References Cited

FOREIGN PATENT DOCUMENTS

| | | |
|---|---|---|
| JP | 2010-083168 A | 4/2010 |
| JP | 2010-149650 A | 7/2010 |
| JP | 2012-035708 A | 2/2012 |
| JP | 2018-114845 A | 7/2018 |

OTHER PUBLICATIONS

International Search Report dated Nov. 9, 2021 issued in International Application No. PCT/JP2021/032606, with English translation, 6 pages.

* cited by examiner

STEER-BY-WIRE STEERING APPARATUS

TECHNICAL FIELD

The present invention relates to a steer-by-wire steering apparatus.

BACKGROUND ART

A steer-by-wire steering system according to Patent Document 1 includes: a driver-operable steering device; a driver-operable steering side motor that provides a steering reaction force to a steering shaft of the driver-operable steering device; a road-wheel-steering side motor that provides a steering force to a rack shaft of a road-wheel-steering device; and an electric power supply control unit that controls power supply to the driver-operable steering side motor and the road-wheel-steering side motor. The electric power supply control unit controls the power supply to the driver-operable steering side motor to increase the steering reaction force when the duty ratio of a duty signal generated to control the power supply to the road-wheel-steering side motor falls on a set value at which a road-wheel-steering angle stops tracking a driver-operated steering angle.

REFERENCE DOCUMENT LIST

Patent Document

Patent Document 1: JP 2018-114845 A

SUMMARY OF THE INVENTION

Problem to be Solved by the Invention

In steer-by-wire steering apparatuses, when a driver abruptly manipulates a steering operation input member, such as a steering wheel, there may be a response delay of a steering unit in its steering amount (in other words, steering angles of steered wheels). This may lead to a delay in vehicle behavioral change with respect to the driver's manipulation of the steering operation input member, thereby causing the driver to perceive a difference in vehicle behavior from the driver's expectation.

It is possible to reduce such response delays in the steering amount by increasing the steering reaction force in response to the occurrence of the delay to curb the manipulation speed of the steering operation input member.

However, if the steering reaction force is controlled based on a response delay inferred from on the operation amount of a steering actuator, the resulting steering reaction force may be excessive or deficient with respect to the response delay in the steering amount because the response delay varies depending on conditions, such as the state of the road. Because of this, the driver's perception of a difference in vehicle behavior from the driver's expectation may not be inhibited sufficiently, or the steering reaction force may be excessive.

The present invention has been achieved in view of the conventional circumstances and provides a steer-by-wire steering apparatus that can appropriately control a steering reaction force in correspondence with a response delay in the steering amount of a steering unit with respect to a manipulation amount of a steering operation input member.

Means for Solving the Problem

In one aspect of the present invention, a control unit of a steer-by-wire steering apparatus includes: a reaction force actuator control section that controls an output amount of a reaction force actuator; a steering actuator control section that controls a steering actuator in response to a manipulation of a steering operation input member, the steering actuator steering steered wheels via a steering unit; a deviation recognition section that recognizes a deviation between a manipulation amount of the steering operation input member and a steering amount of the steering unit; and a reaction force actuator output boost section that, when the deviation increases, increases the output amount of the reaction force actuator controlled by the reaction force actuator control section.

Effects of the Invention

According to the present invention, the steering reaction force can be appropriately controlled in correspondence with a response delay in the steering amount of the steering unit with respect to the manipulation amount of the steering operation input member.

MODE FOR CARRYING OUT THE INVENTION

Some embodiments of a steer-by-wire steering apparatus according to the present invention are described below with reference to the drawings.

Figure 1:
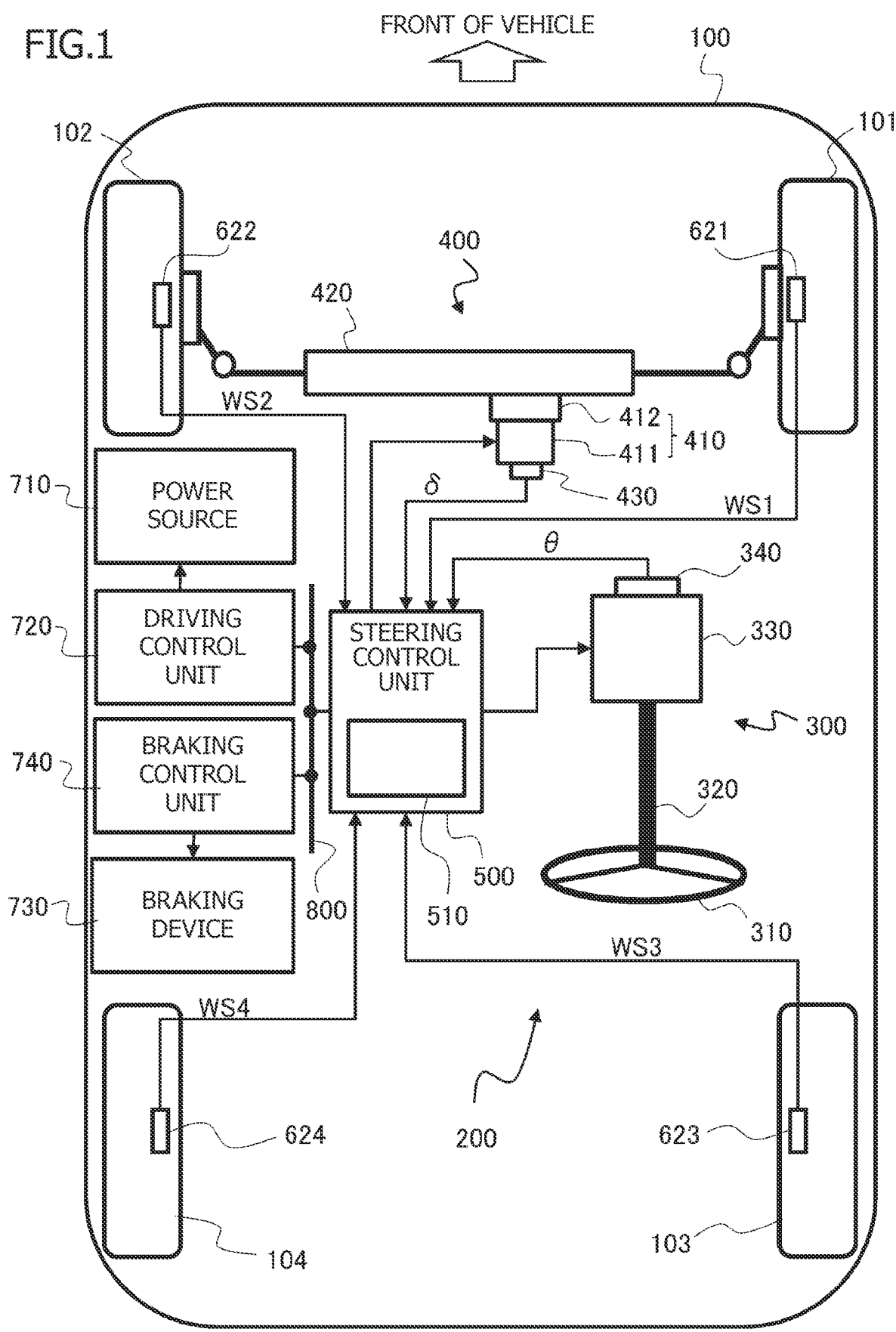
FIG. 1 is a system configuration diagram of a steer-by-wire steering apparatus.

FIG. 1 is a system configuration diagram showing an aspect of a steer-by-wire steering apparatus 200 as installed in a vehicle 100, such as an automobile.

Steering apparatus 200 is a steering system in which front wheels 101 and 102 (in other words, front tires), which are steered wheels, are mechanically separate from a steering wheel 310, which is a steering operation input member.

Steering apparatus 200 includes: a steering input device 300 including steering wheel 310; a steering device 400; and a steering control unit 500, which is a control unit that controls steering input device 300 and steering device 400.

Steering input device 300 includes steering wheel 310, a steering shaft 320, a reaction force actuator 330, and a manipulation angle sensor 340.

Steering shaft 320 turns as steering wheel 310 is turned but is mechanically separate from front wheels 101 and 102.

Reaction force actuator 330 is a device that gives a steering reaction force to steering wheel 310 by using a motor or the like, and includes, in addition to the motor, a torque damper, a manipulation angle restriction mechanism, a speed reducer, and the like.

Because steering input device 300 includes reaction force actuator 330, steering wheel 310 rotates due to a difference between a manipulation torque generated by the driver of vehicle 100 manipulating steering wheel 310 and a steering reaction torque generated by reaction force actuator 330.

Manipulation angle sensor 340 detects a manipulation angle θ [deg] of steering wheel 310, in other words, a manipulation amount of the steering operation input member.

For instance, manipulation angle sensor 340 senses that the manipulation angle θ is zero when steering wheel 310 is in a neutral position, a manipulation angle θ formed in a right direction from the neutral position is a positive angle, and a manipulation angle θ formed in a left direction from the neutral position is a negative angle.

Steering device 400 includes: a steering actuator 410 including a motor 411, a speed reducer 412, and the like; a steering unit 420 including a mechanism for converting rotational motion to linear motion, such as a rack and pinion; and a steering angle sensor 430 that detects a steering angle δ of front wheels 101 and 102 (in other words, a front tire steer angle) from the position of steering actuator 410.

Steering actuator 410 steers front wheels 101 and 102 via steering unit 420, and steering angle sensor 430 detects the steering angle δ [deg], which corresponds to a steering amount of the steering unit 420.

Steering angle sensor 430 detects a rotation angle of an output shaft of motor 411, which is included in steering actuator 410, as a physical quantity that correlates with the steering angle δ.

In addition, vehicle 100 includes wheel speed sensors 621 to 624 that respectively detect wheel speeds WS1 to WS4, which are rotation speeds of respective wheels 101 to 104.

Steering control unit 500 is an electronic control unit that mainly includes a microcomputer 510 including an MPU (Microprocessor Unit), a ROM (Read Only Memory), and a RAM (Random Access Memory).

Steering control unit 500 receives detection signals output by manipulation angle sensor 340, steering angle sensor 430, and wheel speed sensors 621 to 624, respectively.

Steering control unit 500 calculates a vehicle speed V [km/h] of vehicle 100 based on information on the wheel speeds WS1 to WS4 of respective wheels 101 to 104 output by respective wheel speed sensors 621 to 624.

Instead of obtaining the vehicle speed V based on outputs from wheel speed sensors 621 to 624, steering control unit 500 can obtain the vehicle speed V, for instance, from the rotation speed of an output shaft of a power source 710.

Furthermore, microcomputer 510 of steering control unit 500 performs arithmetic processing based on information, such as the manipulation angle θ, the steering angle δ, and the vehicle speed V, to obtain a command signal for the steering reaction torque Ts and a command signal for the steering angle δ, in other words, a target value for the steering reaction torque Ts and a target value for the steering angle δ.

Microcomputer 510 of steering control unit 500 then outputs a command signal for the steering reaction torque Ts to reaction force actuator 330 and a command signal for the steering angle δ to steering actuator 410 to thereby control the steering reaction torque Ts to be applied to steering wheel 310 and the steering angle δ.

Vehicle 100 also includes a driving and braking device including: power source 710, such as a motor or an internal combustion engine; a braking device 730, such as a hydraulic brake; a driving control unit 720 that controls power source 710; and a braking control unit 740 that controls braking device 730.

Steering control unit 500, driving control unit 720, and braking control unit 740 communicate with one another via a communication bus 800 of an in-vehicle network.

First Embodiment

Figure 2:
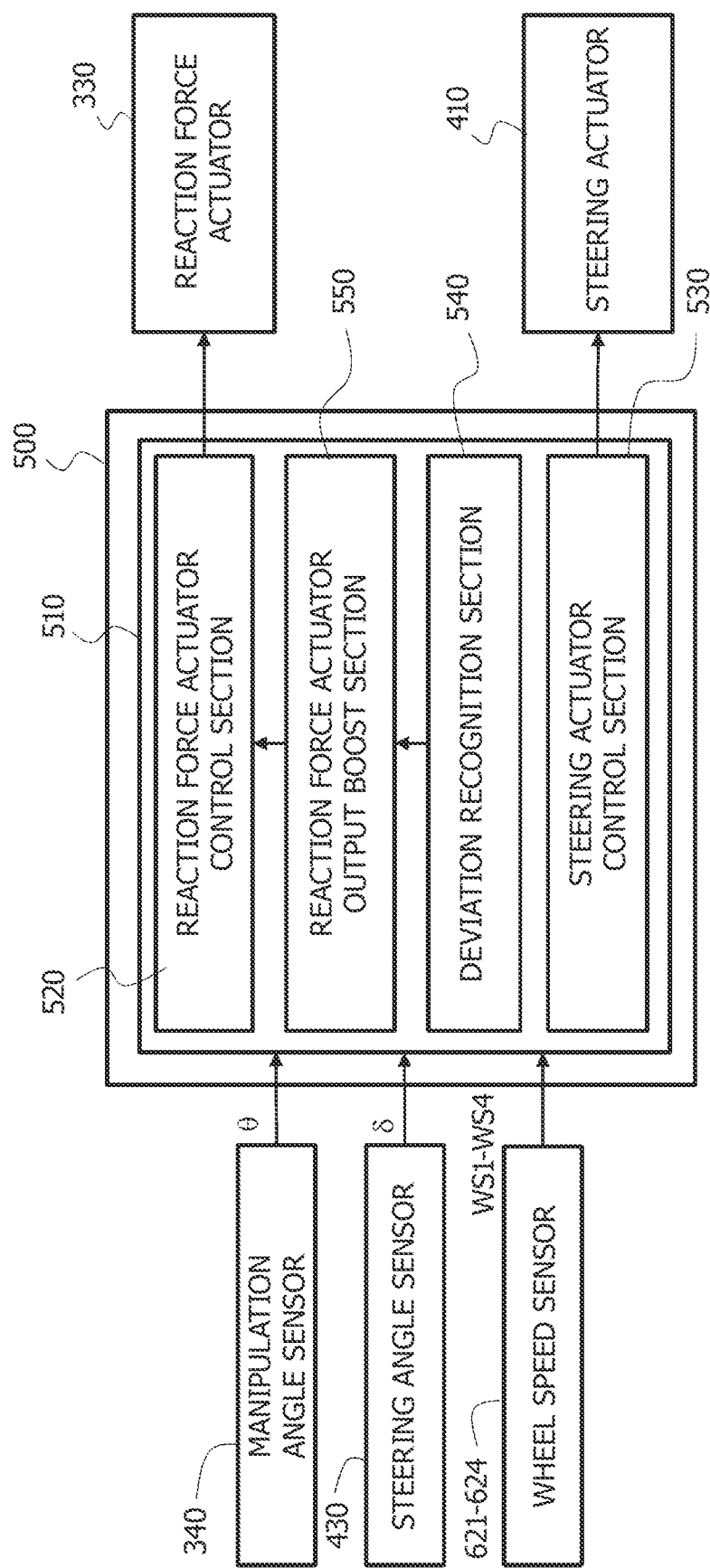
FIG. 2 is a functional block diagram of a steering control unit.

FIG. 2 is a functional block diagram showing steering control unit 500 according to a First Embodiment.

Microcomputer 510 of steering control unit 500 includes, in the form of software, functions of a reaction force actuator control section 520, a steering actuator control section 530, a deviation recognition section 540, and a reaction force actuator output boost section 550.

Reaction force actuator control section 520 outputs a command signal for the steering reaction torque Ts to reaction force actuator 330 to control the steering reaction torque Ts, in other words, an output amount of reaction force actuator 330.

Steering actuator control section 530 outputs a command signal for the steering angle δ, which corresponds to the manipulation angle θ of steering wheel 310, to steering actuator 410 to control steering actuator 410 in response to a manipulation of steering wheel 310.

Deviation recognition section 540 recognizes a deviation between a manipulation amount of the steering operation input member and a steering amount of the steering unit. That is, deviation recognition section 540 recognizes an angular deviation AE [deg], which is a deviation between the manipulation angle θ of steering wheel 310 and the steering angle δ of front wheels 101 and 102.

Reaction force actuator output boost section 550 increases the output amount of reaction force actuator 330 controlled by reaction force actuator control section 520, in other words, the steering reaction torque Ts, when the angular deviation AE recognized by deviation recognition section 540 increases.

Control performed by steering actuator control section 530 on the steering angle δ is described below in detail.

Steering actuator control section 530 calculates a target steering angle δtg based on a detection value for the manipulation angle θ of steering wheel 310 and a set value for a steering gear ratio Kg. Steering actuator control section 530 calculates a control signal to be output to steering actuator 410 (in other words, a steering angle command signal) so that a detection value for the steering angle δ becomes closer to the target steering angle δtg.

Steering actuator control section 530 then outputs the calculated control signal to steering actuator 410 to control the steering angle δ of front wheels 101 and 102 for the target steering angle δtg.

The steering gear ratio Kg is defined as follows: the steering gear ratio Kg=the steering angle δ of front wheels 101 and 102/the manipulation angle θ of steering wheel 310.

Steering actuator control section 530 can variably set the steering gear ratio Kg in accordance with conditions, such as the vehicle speed V.

Control performed by reaction force actuator control section 520, deviation recognition section 540, and reaction force actuator output boost section 550 on the steering reaction torque Ts is described below in detail.

Figure 3:
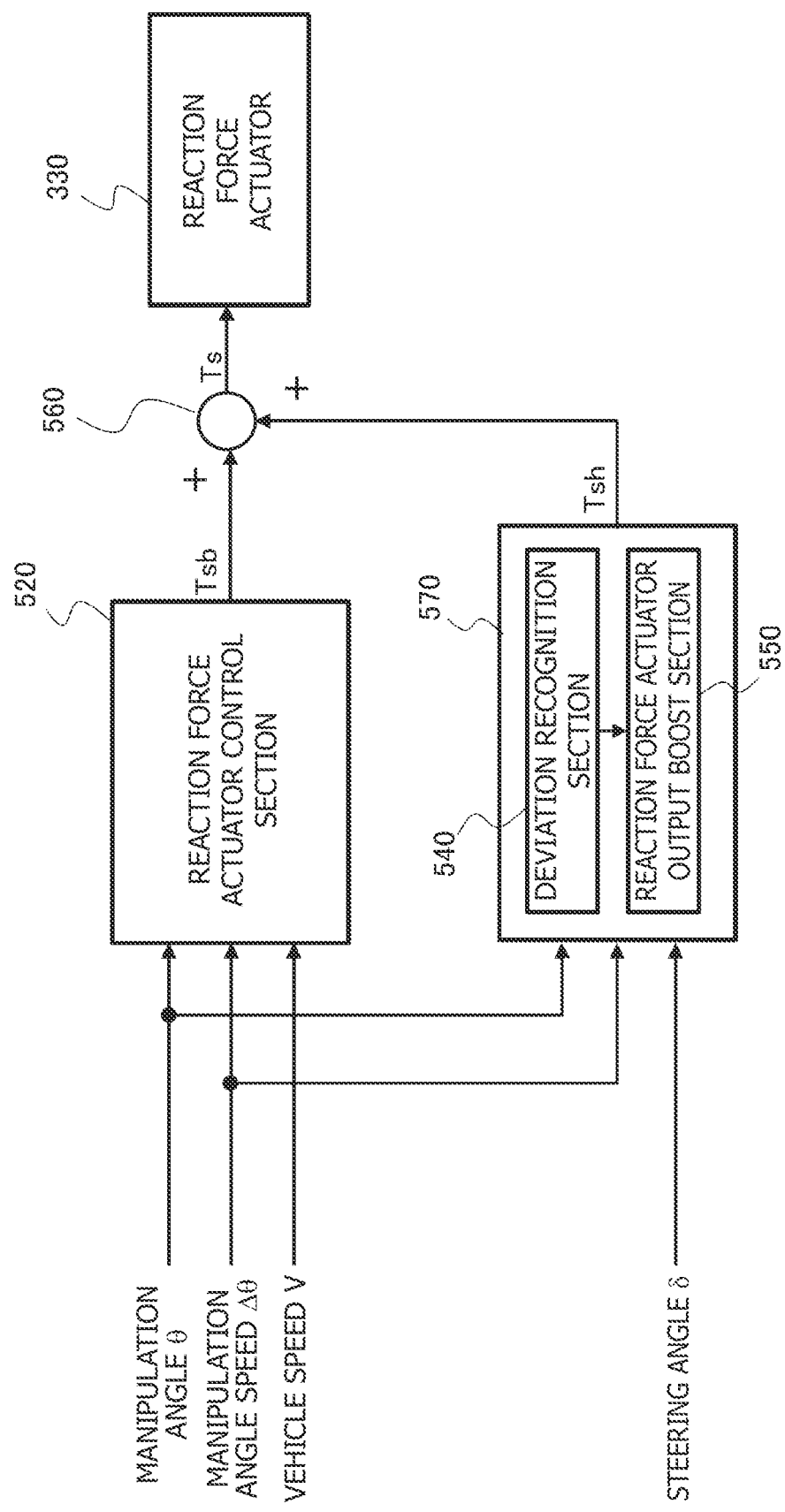
FIG. 3 is a functional block diagram showing a reaction force actuator control section and a reaction force actuator output boost section.

FIG. 3 is a block diagram schematically showing functions of reaction force actuator control section 520, deviation recognition section 540, and reaction force actuator output boost section 550.

Reaction force actuator control section 520 obtains information on the manipulation angle θ, a manipulation angle speed Δθ [deg/s] calculated from the manipulation angle θ, and the vehicle speed V of vehicle 100, and calculates a basic command value Tsb for the steering reaction torque Ts [Nm] (in other words, an output amount of reaction force actuator 330) based on the obtained information.

Reaction force actuator control section 520 sets the basic command value Tsb to a greater value as the manipulation angle θ increases, and sets the basic command value Tsb to a greater value as the manipulation angle speed Δθ increases. Furthermore, reaction force actuator control section 520 sets the basic command value Tsb to a smaller value as the vehicle speed V decreases.

Steering control unit 500 obtains the manipulation angle θ and the steering angle δ as values with signs that indicate the directions of manipulation.

However, in the description of the control of the steering reaction torque Ts provided herein, the distinction of the directions of manipulation indicated by the signs is omitted, and positive values (in other words, absolute values) are assumed for the manipulation angle θ, the manipulation angle speed Δθ, the steering angle δ, and the steering reaction torque Ts, regardless of the direction of manipulation, for the sake of simplification of the description.

A correction command calculation section 570 that includes deviation recognition section 540 and reaction force actuator output boost section 550 obtains information on the manipulation angle θ, the manipulation angle speed Δθ, and the steering angle δ.

Correction command calculation section 570 calculates a correction command value Tsh for the steering reaction torque Ts based on the obtained information, the correction command value Tsh being for inhibiting a response delay in the steering angle δ with respect to a change in the manipulation angle θ.

An adder 560 obtains the basic command value Tsb calculated by reaction force actuator control section 520 and the correction command value Tsh calculated by correction command calculation section 570.

Adder 560 then adds the correction command value Tsh to the basic command value Tsb to obtain a final command value for the steering reaction torque Ts, and outputs a control signal corresponding to the obtained command value to reaction force actuator 330.

Figure 4:
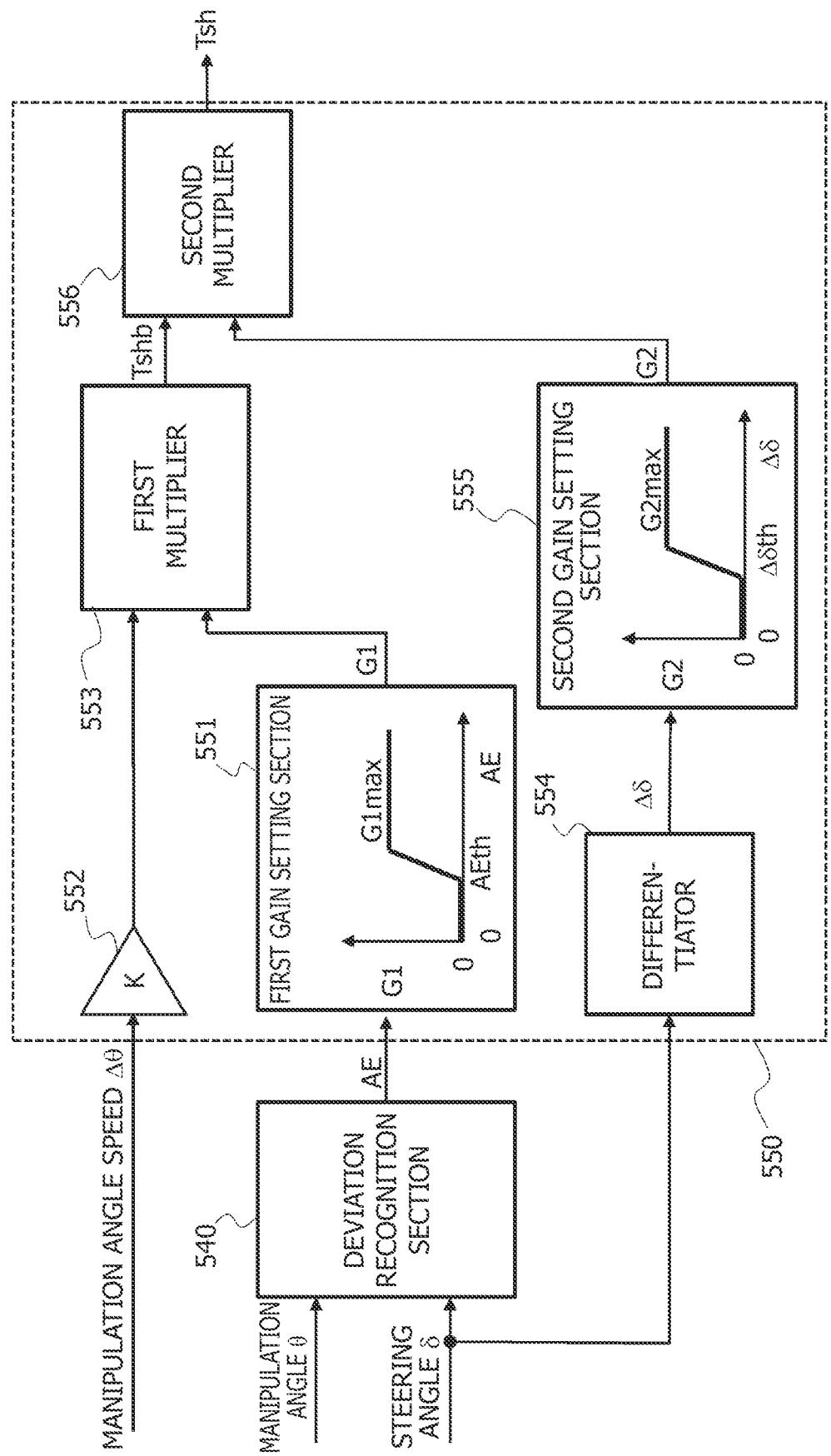
FIG. 4 is a functional block diagram of a reaction force actuator output boost section.

FIG. 4 is a block diagram showing the functions of deviation recognition section 540 and reaction force actuator output boost section 550 in detail.

Deviation recognition section 540 calculates the angular deviation AE [deg], which is a deviation between the manipulation angle θ and the steering angle δ, (AE=θ−δ).

Steering angle sensor 430 detects a rotation angle of a pinion shaft of steering unit 420 as the steering angle δ, and deviation recognition section 540 recognizes that the angular deviation AE is zero when the steering angle δ is consistent with the manipulation angle θ.

If a delay occurs in the steering angle δ tracking a change in the manipulation angle θ and thereby a discrepancy arises between the manipulation angle θ of steering wheel 310 and the steer angle of front wheels 101 and 102, the angular deviation AE becomes greater than zero.

The greater the discrepancy between the manipulation angle θ of steering wheel 310 and the steer angle of front wheels 101 and 102 becomes due to a large response delay, the greater the angular deviation AE becomes.

Reaction force actuator output boost section 550 includes a first gain setting section 551, a gain 552, a first multiplier 553, a differentiator 554, a second gain setting section 555, and a second multiplier 556.

First gain setting section 551 sets a first gain G1 (G1≥0) based on the angular deviation AE recognized by deviation recognition section 540.

First gain setting section 551 sets the first gain G1 to zero when the angular deviation AE is equal to or less than a predefined value AEth (AEth>0). When the angular deviation AE is greater than the predefined value AEth, first gain setting section 551 sets the first gain G1 to a greater value as the angular deviation AE increases, until the first gain G1 reaches an upper limit at a maximum value G1 max (G1 max>0).

That is, first gain setting section 551 sets the first gain G1 to a greater value as the angular deviation AE increases due to a greater delay in the steering angle δ tracking a change in the manipulation angle θ.

Gain 552 multiplies the manipulation angle speed Δθ by K (K>0) based on a gain constant K and outputs the result.

First multiplier 553 then multiplies a signal that has passed gain 552, that is, a signal resulting from multiplying the manipulation angle speed Δθ by K, by the first gain G1 output by first gain setting section 551 and outputs the result as a basic correction command value Tshb for the steering reaction torque Ts (Tshb=Δθ·K·G1).

The basic correction command value Tshb is a value that increases the steering reaction torque Ts when the angular deviation AE increases, and this value increases as the manipulation angle speed Δθ increases.

That is, reaction force actuator output boost section 550 increases the output amount of reaction force actuator 330 when the angular deviation AE increases. Reaction force actuator output boost section 550 also increases the amount of increase for the output amount of reaction force actuator 330 as the manipulation speed of steering wheel 310 increases.

Differentiator 554 obtains a signal of the steering angle δ, calculates a steering angle speed Δδ [deg/s], which is a time derivative of the steering angle δ, and outputs the result.

Second gain setting section 555 sets a second gain G2 (G2≥0) based on the steering angle speed Δδ obtained by differentiator 554.

Second gain setting section 555 sets the second gain G2 to zero when the steering angle speed Δδ is equal to or less than a predefined value Δδth (Δδth>0). When the steering angle speed Δδ is greater than the predefined value Δδth, second gain setting section 555 sets the second gain G2 to a greater value as the steering angle speed Δδ increases, until the second gain G2 reaches an upper limit at a maximum value G2 max (G2 max>0).

Second multiplier 556 multiplies the basic correction command value Tshb, which is the output of first multiplier 553, by the second gain G2 output by second gain setting section 555 and outputs the resultant value as the correction command value Tsh (Tsh=Tshb·G2) for the steering reaction torque Ts, the correction command value Tsh being for inhibiting a response delay in the steering angle δ with respect to a change in the manipulation angle θ.

Adder 560 shown in FIG. 3 adds the correction command value Tsh output by second multiplier 556 in reaction force actuator output boost section 550 to the basic command value Tsb calculated by reaction force actuator control section 520, and outputs the result of the addition to reaction force actuator 330 as a final command value for the steering reaction torque Ts (Ts=Tsb+Tsh).

In other words, adder 560 shown in FIG. 3 makes increasing correction to the basic command value Tsb, which is a basic set value for the output amount of reaction force actuator 330, by using the correction command value Tsh, which is an amount of increase corresponding to the angular deviation AE, to determine a final set value for the output amount of reaction force actuator 330.

An operation of reaction force actuator output boost section 550 is described next.

Figure 5:
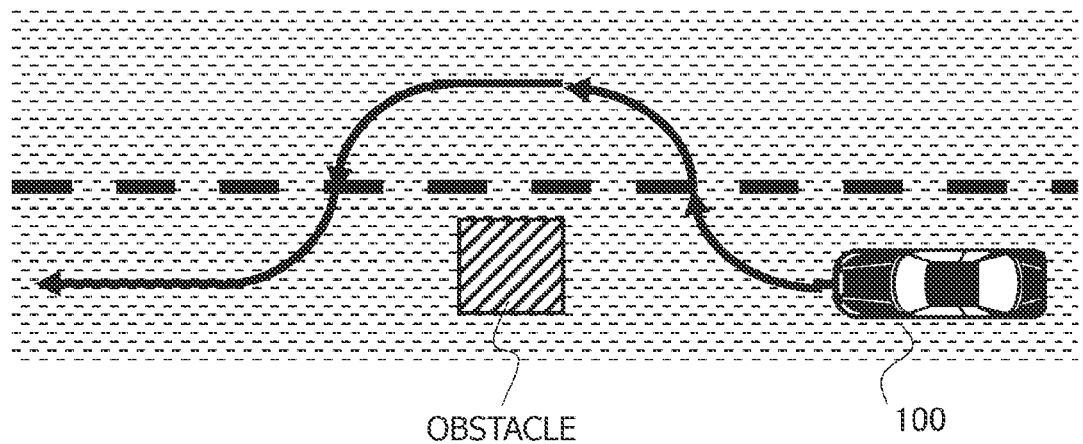
FIG. 5 is a diagram showing an example situation of a steering manipulation to avert an accident.

FIG. 5 shows a situation of accident aversion in which a driver abruptly manipulates steering wheel 310 so that vehicle 100 may avoid an obstacle on a road, as an example of a situation in which a delay occurs in the steering angle δ changing to track a change in the manipulation angle θ.

Figure 6:
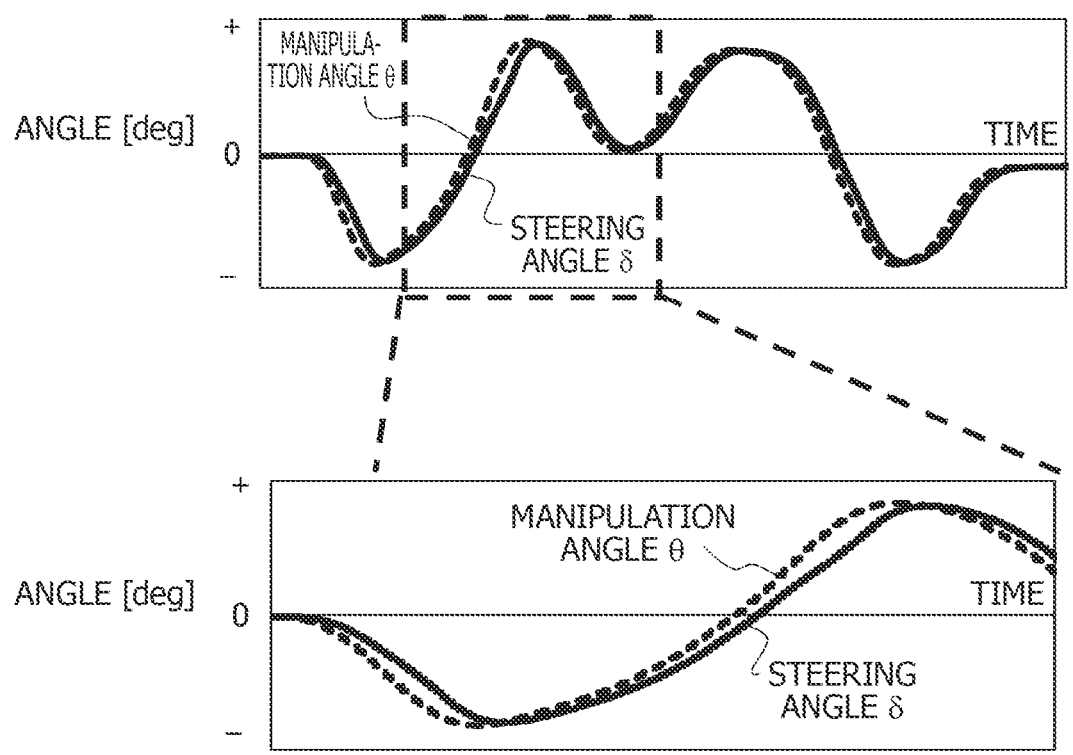
FIG. 6 is a time chart showing a delay in a steering angle $\delta$ with respect to a manipulation angle $\theta$.

FIG. 6 is a time chart showing how the delay occurs in the steering angle δ changing to track a change in the manipulation angle θ when the steering manipulation for avoiding an accident shown in FIG. 5 is performed.

As described above, steer-by-wire steering apparatus 200 is a steering system in which front wheels 101 and 102, which are steered wheels, are mechanically separate from steering wheel 310.

Thus, if a driver abruptly manipulates steering wheel 310 in a situation of the accident aversion shown in FIG. 5 or the like, a delay occurs in the steering angle δ tracking an abrupt change in the manipulation angle θ involved in the abrupt manipulation of the steering wheel 310, for reasons of the conditions of the road, the performance of steering actuator 410, or the like.

When the delay occurs in the steering angle δ tracking the manipulation of steering wheel 310, a delay occurs in behavioral change of vehicle 100 with respect to the manipulation of steering wheel 310, causing the driver of vehicle 100 to perceive the difference in vehicle behavior from the driver's expectation.

When the delay occurs in the steering angle δ responding to the change in the manipulation angle θ, an increase in the steering reaction torque Ts inhibits an abrupt change in the manipulation speed of steering wheel 310 and hence an abrupt change in the target steering angle δtg, thereby inhibiting a delay in the tracking of the steering angle δ.

Thus, in a situation in which a delay occurs in the steering angle δ responding to the change in the manipulation angle θ, reaction force actuator output boost section 550 sets the correction command value Tsh in correspondence with the manipulation angle speed Δθ and the angular deviation AE to increase the steering reaction torque Ts, thereby inhibiting the delay in the tracking of the steering angle δ.

That is, since a greater manipulation angle speed Δθ tends to cause a greater delay in the steering angle δ tracking the change in the manipulation angle θ, reaction force actuator output boost section 550 increases the output of gain 552 as the manipulation angle speed Δθ increases, so that the correction command value Tsh is increased.

Furthermore, when the manipulation angle speed Δθ reaches zero because, for instance, steering wheel 310 is turned back, gain 552 outputs zero, so reaction force actuator output boost section 550 sets the correction command value Tsh to zero to thereby cancel the increasing correction for the steering reaction torque Ts.

Furthermore, when the angular deviation AE is equal to or less than the predefined value AEth, first gain setting section 551 sets the first gain G1 to zero, so that reaction force actuator output boost section 550 sets the correction command value Tsh to zero to thereby cancel the increasing correction for the steering reaction torque Ts in situations in which the steering angle δ is tracking a change in the manipulation angle θ with a delay within a tolerable range.

On the other hand, when the angular deviation AE increases, exceeding the predefined value AEth, reaction force actuator output boost section 550 sets the first gain G1 to a greater value as the angular deviation AE increases, so that the correction command value Tsh is increased, and thereby, an increase in the angular deviation AE, that is, an increase in delay in the tracking of the steering angle δ, is inhibited.

Thus, when the steering angle δ is tracking a change in the manipulation angle θ within the acceptable delay under a condition that tends to cause a delay in the steering angle δ due to a large manipulation angle speed Δθ, reaction force actuator output boost section 550 can inhibit an unnecessary increase in the steering reaction torque Ts, thereby being capable of inhibiting an unnecessary increase in steering load on the driver.

Furthermore, when a delay in the steering angle θ with respect to a change in the manipulation angle θ is greater than the acceptable range, reaction force actuator output boost section 550 sets the correction command value Tsh to a greater value as the manipulation angle speed Δθ increases and also sets the correction command value Tsh to a greater value as the angular deviation AE increases.

Therefore, reaction force actuator output boost section 550 can effectively inhibit the driver from perceiving the difference in vehicle behavior from the driver's expectation caused by the delay in the tracking of the steering angle θ, while inhibiting excessive increase in the steering reaction torque Ts.

Furthermore, when the manipulation angle speed Δθ reaches zero because, for instance, steering wheel 310 is turned back, reaction force actuator output boost section 550 sets the correction command value Tsh to zero and thereby cancels the increasing correction for the steering reaction torque Ts. Thus, reaction force actuator output boost section 550 can inhibit the steering reaction torque Ts from being maintained at a high level while steering wheel 310 is turned back, thereby being capable of inhibiting the driver from perceiving a difference from the driver's expectation.

Furthermore, when the steering angle speed Δδ is equal to or less than the predefined value Δδth while the steering angle δ is changing extremely slowly or maintaining a constant value, reaction force actuator output boost section 550 sets the second gain G2 to zero to thereby set the correction command value Tsh to zero, canceling the increasing correction for the steering reaction torque Ts.

Thus, reaction force actuator output boost section 550 can inhibit unnecessary increasing correction for the steering reaction torque Ts when, for instance, at least one of front wheel 101 and 102, each of which is a steered wheel, runs against an obstacle, such as a curb, preventing the steering angle δ from changing.

Furthermore, reaction force actuator output boost section 550 obtains the steering angle δ for use in the calculation of the correction command value Tsh, based on the rotation angle of the output shaft of motor 411, which is included in steering actuator 410.

Thus, reaction force actuator output boost section 550 can make the increasing correction to the steering reaction torque Ts in correspondence with a response delay of motor 411 in a manner independent of the speed reducer that reduces the output of motor 411 or the like.

Figure 7:
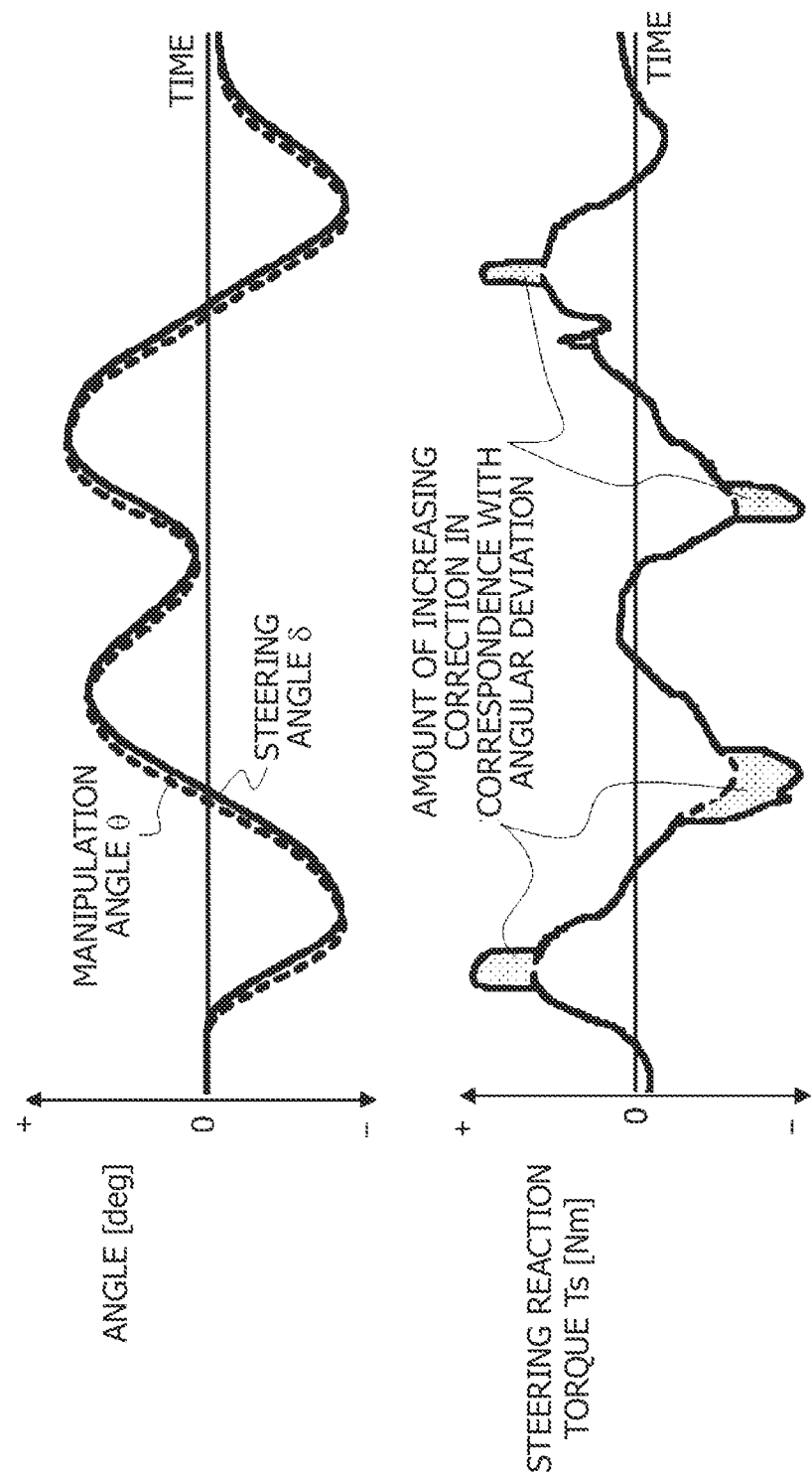
FIG. 7 is a time chart showing increasing correction of a steering reaction torque.

FIG. 7 is a time chart showing correlation between the manipulation angle θ, the steering angle δ, and the steering reaction torque Ts under conditions in which reaction force actuator output boost section 550 performs the increasing correction for the steering reaction torque Ts.

When a delay occurs in the steering angle δ tracking a change in the manipulation angle θ, generating a discrepancy between the manipulation angle θ and the steering angle δ, reaction force actuator output boost section 550 increases the correction command value Tsh in correspondence with the increase in the angular deviation AE to thereby make the increasing correction to the steering reaction torque Ts, thus inhibiting an abrupt manipulation of steering wheel 310 and inhibiting the delay in the tracking of the steering angle δ from becoming excessive.

Therefore, the driver of vehicle 100 can be inhibited from perceiving the difference in vehicle behavior from the driver's expectation caused by the delay in the tracking of the steering angle δ.

Second Embodiment

Figure 8:
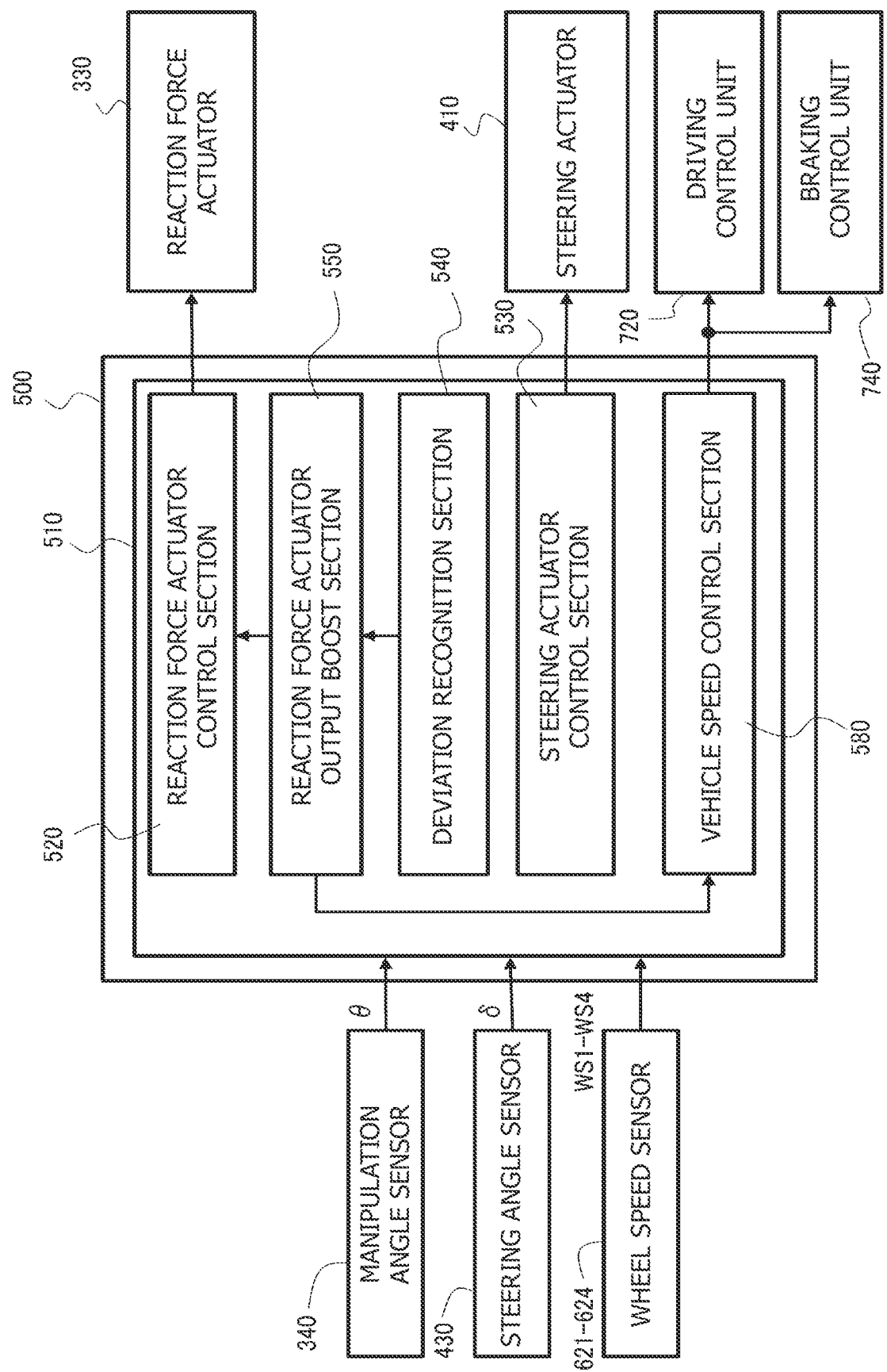
FIG. 8 is a functional block diagram of the steering control unit including a vehicle speed control section.

FIG. 8 is a functional block diagram showing steering control unit 500 according to a Second Embodiment.

In steering control unit 500 in FIG. 8, microcomputer 510 includes, in the form of software, functions of a vehicle speed control section 580 that reduces the vehicle speed V when a delay occurs in the steering angle δ tracking a change in the manipulation angle θ, in addition to the functional sections described in the First Embodiment.

When a delay occurs in the steering angle δ tracking a change in the manipulation angle θ and reaction force actuator output boost section 550 makes the increasing correction to the steering reaction torque Ts, vehicle speed control section 580 outputs a control command for reducing the vehicle speed V to at least one of driving control unit 720 and braking control unit 740 (in other words, to the driving and braking device).

That is, when reaction force actuator output boost section 550 makes the increasing correction to the steering reaction torque Ts, vehicle speed control section 580 decelerates vehicle 100 by providing a command to perform at least one of processing of reducing the driving force of vehicle 100 and processing of increasing the braking force of vehicle 100.

Decreasing vehicle speed V when a delay occurs in the steering angle δ tracking a change in the manipulation angle θ reduces road load, thus working to inhibit the delay in the tracking of the steering angle δ.

Thus, steering control unit 500 can inhibit a delay in the tracking of the steering angle δ further effectively, by outputting a command to reduce the vehicle speed V to thereby reduce the road load while increasing the steering reaction torque Ts to thereby inhibit the change in the manipulation angle θ.

Vehicle speed control section 580 can variably set the degree of deceleration of vehicle 100, specifically, the amount of decrease for at least one of the driving force and the amount of increase for the braking force, in correspondence with the amount of increasing correction for the steering reaction torque Ts and the angular deviation AE.

Third Embodiment

In steering control unit 500 according to a Third Embodiment, reaction force actuator output boost section 550 can have hysteresis between an intervention condition and a canceling condition of the increasing correction control of the steering reaction torque Ts, the increasing correction control corresponding to the angular deviation AE.

Reaction force actuator output boost section 550 having the hysteresis as described above can inhibit occurrence of hunting, which is frequent switching between the intervention and cancellation of the increasing correction control of the steering reaction torque Ts corresponding to the angular deviation AE. Thus, reaction force actuator output boost section 550 can inhibit the frequent change in the steering reaction torque Ts from causing degradation in steerability for the driver or from causing the driver to perceive a difference from the driver's expectation.

For example, hysteresis can be given to the change in the first gain G1 with respect to the angular deviation AE in first gain setting section 551, so that reaction force actuator output boost section 550 has hysteresis between the intervention condition and canceling condition of the increasing correction control of the steering reaction torque Ts.

Figure 9:
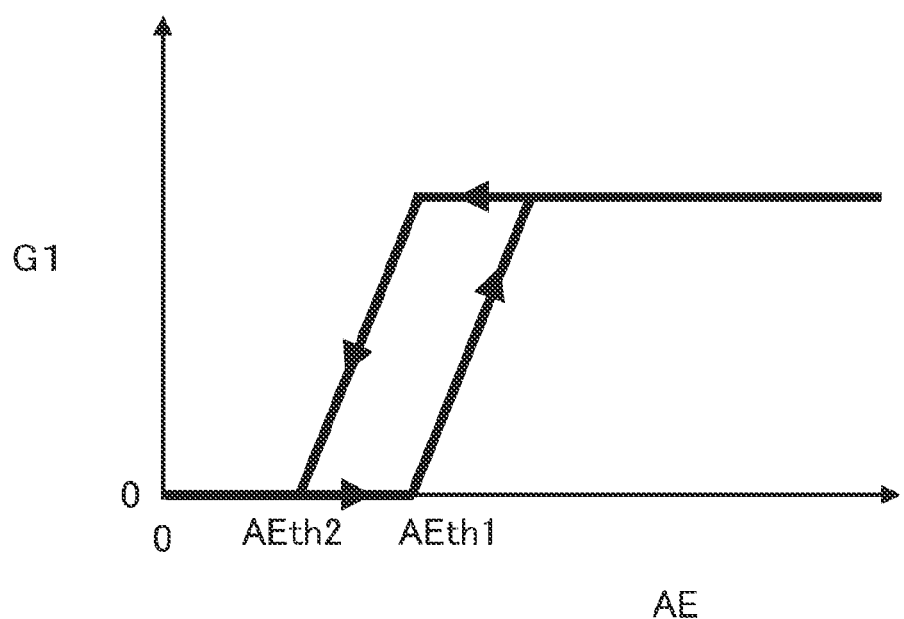
FIG. 9 is a diagram showing hysteresis characteristics of a first gain.

FIG. 9 is a table for use by first gain setting section 551 in conversion of the angular deviation AE to the first gain G1, the table showing an aspect in which hysteresis is given by providing a path of the first gain G1 increasing with increase in the angular deviation AE and a path of the first gain G1 decreasing with decrease in the angular deviation AE, the paths differing from each other.

In hysteresis characteristics of the first gain G1 shown in FIG. 9, when the angular deviation AE increases and reaches a first predefined value AEth1, the first gain G1 becomes greater than zero, satisfying the intervention condition of the increasing correction control of the steering reaction torque Ts.

Then, when the angular deviation AE decreases in a condition in which the increasing correction control of the steering reaction torque Ts is performed, the first gain G1 is set to zero in response to the angular deviation AE reaching a second predefined value AEth2 that is less than the first predefined value AEth1 (AEth1>AEth2), satisfying the canceling condition of the increasing correction control of the steering reaction torque Ts.

That is, the second predefined value AEth2, which is the canceling condition of the increasing correction control of the steering reaction torque Ts, is less than the first predefined value AEth1, which is the intervention condition thereof. Thus, when the angular deviation AE decreases from a value greater than the first predefined value AEth1 to a value equal to or less than the first predefined value AEth1, the canceling condition is not satisfied. The increasing correction control of the steering reaction torque Ts is continued until the angular deviation AE later reaches a value equal to or less than the second predefined value AEth2.

By giving hysteresis to the change in the first gain G1 in this manner, reaction force actuator output boost section 550 has hysteresis between the intervention condition and canceling condition of the increasing correction control of the steering reaction torque Ts.

By having the hysteresis between the intervention condition and canceling condition of the increasing correction control of the steering reaction torque Ts, reaction force actuator output boost section 550 can inhibit occurrence of hunting, which is frequent switching between the intervention and cancellation of the increasing correction control of the steering reaction torque Ts corresponding to the angular deviation AE.

Note that the method of giving hysteresis between the intervention condition and canceling condition of the increasing correction control of the steering reaction torque Ts corresponding to the angular deviation AE is not limited to the method of giving hysteresis to the change in the first gain G1 with respect to the change in the angular deviation AE.

For instance, reaction force actuator output boost section 550 can have hysteresis in the change in the first gain G1 with respect to the change in the angular deviation AE by correcting the angular deviation AE obtained by deviation recognition section 540 and using the result to set the first gain G1.

Specifically, reaction force actuator output boost section 550 includes a correction section that converts the angular deviation AE obtained by deviation recognition section 540 and outputs the result to first gain setting section 551, and the correction section outputs the angular deviation AE as obtained by deviation recognition section 540 when the angular deviation AE increases, and outputs a value greater than the angular deviation AE obtained by deviation recognition section 540 when the angular deviation AE decreases.

By performing correction processing on the angular deviation AE as described above, hysteresis can be also given between the intervention condition and canceling condition of the increasing correction control of the steering reaction torque Ts.

Fourth Embodiment

Figure 10:
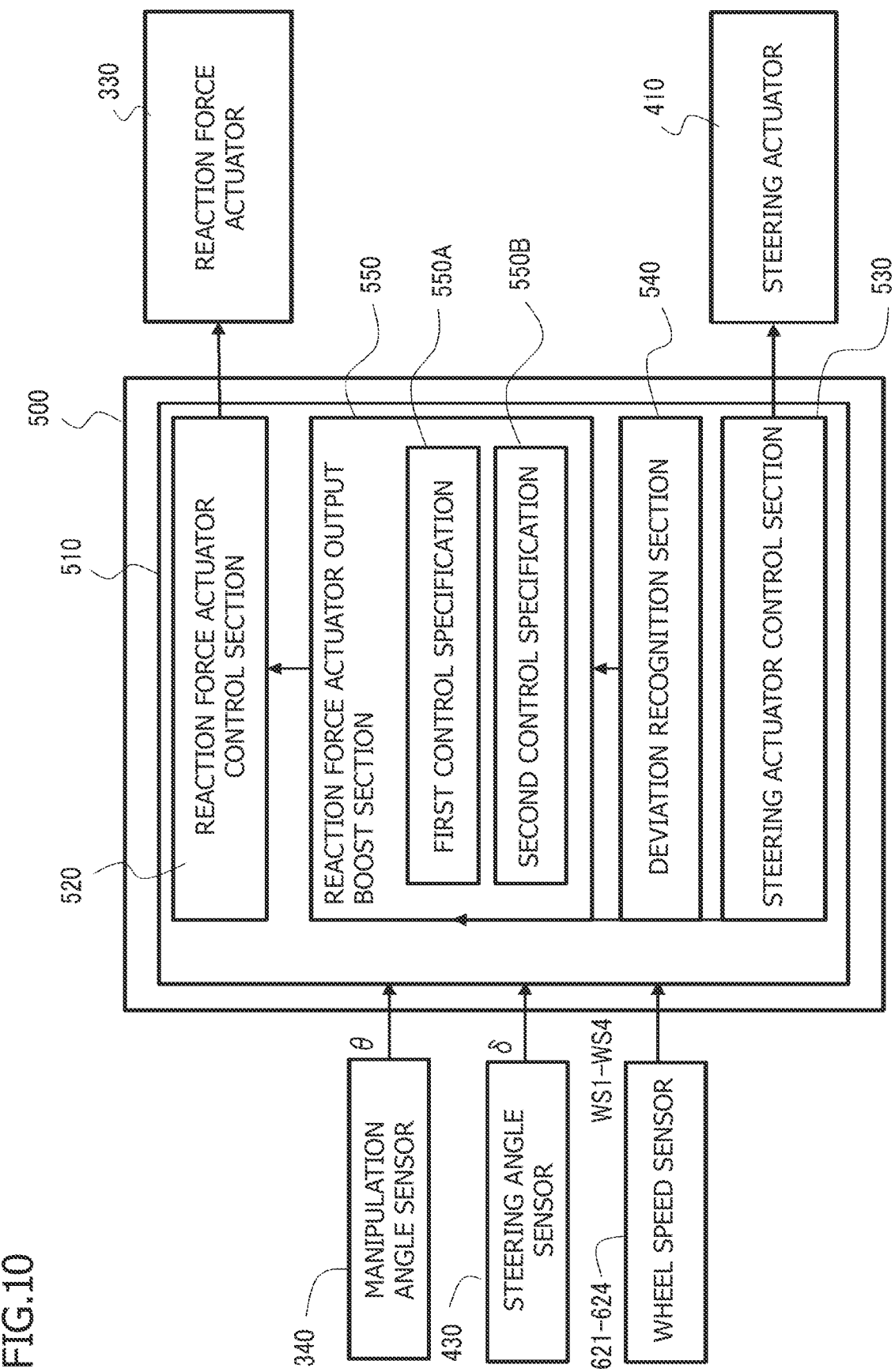
FIG. 10 is a functional block diagram of the steering control unit that switches control specifications in accordance with output limitation of a steering actuator.

FIG. 10 is a functional block diagram showing steering control unit 500 according to a Fourth Embodiment.

In steering control unit 500 in FIG. 10, reaction force actuator output boost section 550 switches specifications for the increasing correction control of the steering reaction torque Ts in accordance with whether or not there is a situation in which the output of steering actuator 410 (motor 411, specifically) is limited to a level lower than a normal level.

Specifically, when the output of steering actuator 410 is limited, reaction force actuator output boost section 550 performs at least one of: processing of relaxing the intervention condition of the increasing correction control of the steering reaction torque Ts corresponding to the angular deviation AE, in comparison to the intervention condition used when the output of steering actuator 410 is not limited; and processing of increasing the amount of increasing correction for the steering reaction torque Ts corresponding to the angular deviation AE (in other words, the amount of increase for the output amount of reaction force actuator 330), in comparison to the amount of increasing correction used when the output of steering actuator 410 is not limited.

For example, the maximum driving current of motor 411 may be limited to a level lower than its normal level due to an anomaly of motor 411, such as overheating of a driving circuit of motor 411, causing the output of steering actuator 410 to be limited to a level lower than the normal level.

In such situations in which the output of steering actuator 410 is limited, a response delay of steering actuator 410 becomes greater than a normal level, increasing the delay in the steering angle δ with respect to a change in the manipulation angle θ.

Thus, in a situation in which the output of steering actuator 410 is limited, reaction force actuator output boost section 550 performs one of the processing of relaxing the intervention condition and the processing of increasing the amount of increasing correction for the steering reaction torque Ts, so that reaction force actuator output boost section 550 can inhibit the response delay sufficiently even in the situation in which the output of steering actuator 410 is limited.

Specifically, reaction force actuator output boost section 550 switches control specifications in accordance with whether there is a situation in which the output of steering actuator 410 is limited.

FIG. 10 shows an aspect in which reaction force actuator output boost section 550 includes two different control specifications, switches the control specifications in accordance with whether there is a situation in which the output of steering actuator 410 is limited, and performs the selected control specification.

In FIG. 10, reaction force actuator output boost section 550 obtains, from steering actuator control section 530, information on whether there is a situation in which the output of steering actuator 410 is limited.

Furthermore, reaction force actuator output boost section 550 includes, as the control specifications for the increasing correction for the steering reaction torque Ts corresponding to the angular deviation AE, a first control specification 550A that fits a normal situation in which the output of steering actuator 410 is not limited and a second control specification 550B that fits an anomalous situation in which the output of steering actuator 410 is limited.

Reaction force actuator output boost section 550 performs the increasing correction for the steering reaction torque Ts in accordance with first control specification 550A in the normal situation in which the output of steering actuator 410 is not limited, and performs the increasing correction for the steering reaction torque Ts in accordance with second control specification 550B in the anomalous situation in which the output of steering actuator 410 is limited.

Second control specification 550B can be, for instance, a control specification in which the predefined value AEth, which is the threshold value of the angular deviation AE for determining whether the first gain G1 is set to zero or a value greater than zero, is set to a value less than that for first control specification 550A. Alternatively, second control specification 550B can be a control specification that involves the correction section that increases the angular deviation AE to be obtained by first gain setting section 551 to a value greater than that output by deviation recognition section 540.

In this way, when the output of steering actuator 410 is limited, the intervention condition of the increasing correction control of the steering reaction torque Ts corresponding to the angular deviation AE is relaxed in comparison with the intervention condition used when the output of steering actuator 410 is not limited.

Alternatively, second control specification 550B may be, for instance, a control specification in which the maximum value G1max for the first gain G1 in first gain setting section 551 is set to a value greater than that for first control specification 550A, so that the amount of increasing correction for the steering reaction torque Ts is increased when the output of steering actuator 410 is limited.

Thus, by reaction force actuator output boost section 550 selecting one of first control specification 550A and second control specification 550B in accordance with whether there is a situation in which the output of steering actuator 410 is limited, the response delay can be inhibited sufficiently even in a situation in which the output of steering actuator 410 is limited.

Each technical concept described in the foregoing embodiments can be combined as appropriate, as long as there is no conflict.

While the present invention has been described with reference to some preferable embodiments, it will be apparent to those skilled in the art that various modifications are possible based on the basic technical concepts and teaching of the present invention.

For example, a control system can be provided in which the functions of reaction force actuator control section 520, steering actuator control section 530, deviation recognition section 540, and reaction force actuator output boost section 550 are shared by two or more control units.

Furthermore, reaction force actuator output boost section 550 can perform learning control in which correlation between the angular deviation AE and the amount of increase for the steering reaction torque Ts (specifically, the correlation between the angular deviation AE and the first gain G1) is changed based on information about the angular deviation AE used when the increasing correction is performed on the steering reaction torque Ts.

Furthermore, when the maximum driving current for motor 411 is set to a value lower than a normal value as a limitation to the output of steering actuator 410, reaction force actuator output boost section 550 can make increasing correction to the correction command value Tsh, which is the amount of increase for the steering reaction torque Ts, while the driving current of motor 411 is maintained at the maximum driving current value.

Furthermore, reaction force actuator output boost section 550 can increase the correction command value Tsh, which is the amount of increase for the steering reaction torque Ts, as the speed of increase in the angular deviation AE increases.

REFERENCE SYMBOL LIST

100 Vehicle
101 to 104 Wheel (tire)
200 Steer-by-wire steering apparatus
300 Steering input device
310 Steering wheel (steering operation input member)
330 Reaction force actuator
340 Manipulation angle sensor
400 Steering device
410 Steering actuator
411 Motor
420 Steering unit
430 Steering angle sensor
500 Steering control unit (control unit)
520 Reaction force actuator control section
530 Steering actuator control section
540 Deviation recognition section
550 Reaction force actuator output boost section

The invention claimed is:

1. A steer-by-wire steering apparatus, installed in a vehicle, the steer-by-wire steering apparatus comprising:
 a steering input device including:
  a steering operation input member; and
  a reaction force actuator that gives a steering reaction force to the steering operation input member;
 a steering device including:
  a steering unit; and
  a steering actuator that steers a steered wheel via the steering unit; and
 a control unit including:
  a reaction force actuator control section that controls an output amount of the reaction force actuator;
  a steering actuator control section that controls the steering actuator in response to a manipulation of the steering operation input member;
  a deviation recognition section that recognizes a deviation between a manipulation amount of the steering operation input member and a steering amount of the steering unit; and
  a reaction force actuator output boost section that, when the deviation recognized by the deviation recognition section increases, increases the output amount of the reaction force actuator controlled by the reaction force actuator control section, and increases an amount of increase for the output amount of the reaction force actuator as a manipulation speed of the steering operation input member increases,
 wherein the control unit further includes a vehicle speed control section that outputs a control command to reduce a vehicle speed of the vehicle to a driving and braking device of the vehicle when the reaction force actuator output boost section increases the output amount of the reaction force actuator.

2. A steer-by-wire steering apparatus, installed in a vehicle, the steer-by-wire steering apparatus comprising:
 a steering input device including:
  a steering operation input member; and
  a reaction force actuator that gives a steering reaction force to the steering operation input member;
 a steering device including:
  a steering unit; and
  a steering actuator that steers a steered wheel via the steering unit; and
 a control unit including:
  a reaction force actuator control section that controls an output amount of the reaction force actuator;
  a steering actuator control section that controls the steering actuator in response to a manipulation of the steering operation input member;
  a deviation recognition section that recognizes a deviation between a manipulation amount of the steering operation input member and a steering amount of the steering unit; and
  a reaction force actuator output boost section that, when the deviation recognized by the deviation recognition section increases, increases the output amount of the reaction force actuator controlled by the reaction force actuator control section,
 wherein, when an output of the steering actuator is limited, the reaction force actuator output boost section performs at least one of: processing of relaxing an intervention condition of processing of increasing the output amount of the reaction force actuator in correspondence with the deviation, in comparison to the intervention condition used when the output of the steering actuator is not limited; and processing of increasing an amount of increase for the output amount of the reaction force actuator, the amount of increase corresponding to the deviation, in comparison to the amount of increase used when the output of the steering actuator is not limited.

3. The steer-by-wire steering apparatus according to claim 2,
 wherein the steering actuator steers the steered wheel by using a motor, and
 the deviation recognition section detects the steering amount of the steering unit based on a rotation angle of the motor.

4. The steer-by-wire steering apparatus according to claim 2,
wherein the reaction force actuator output boost section has hysteresis between the intervention condition of the processing of increasing the output amount of the reaction force actuator in correspondence with the deviation and a canceling condition of the processing.

* * * * *